Patented Oct. 11, 1932

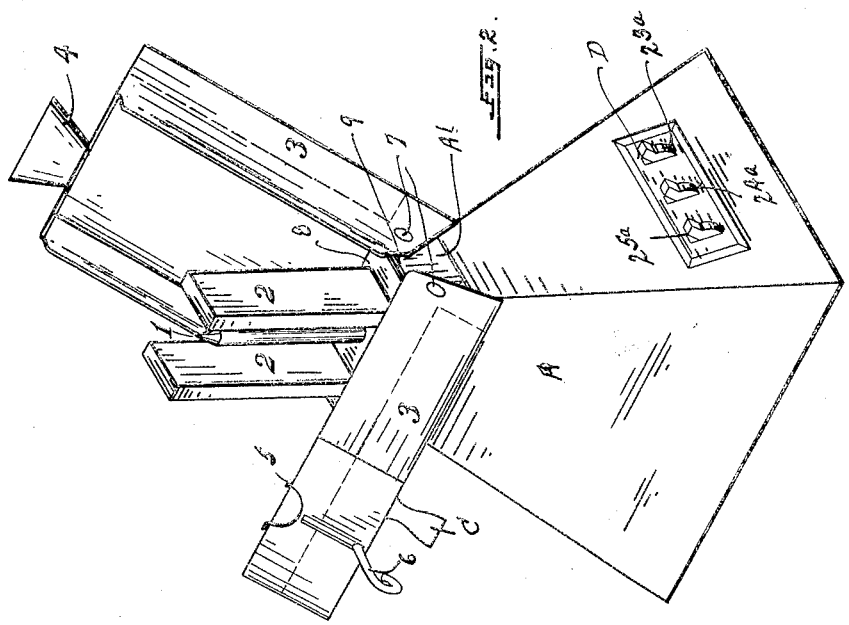
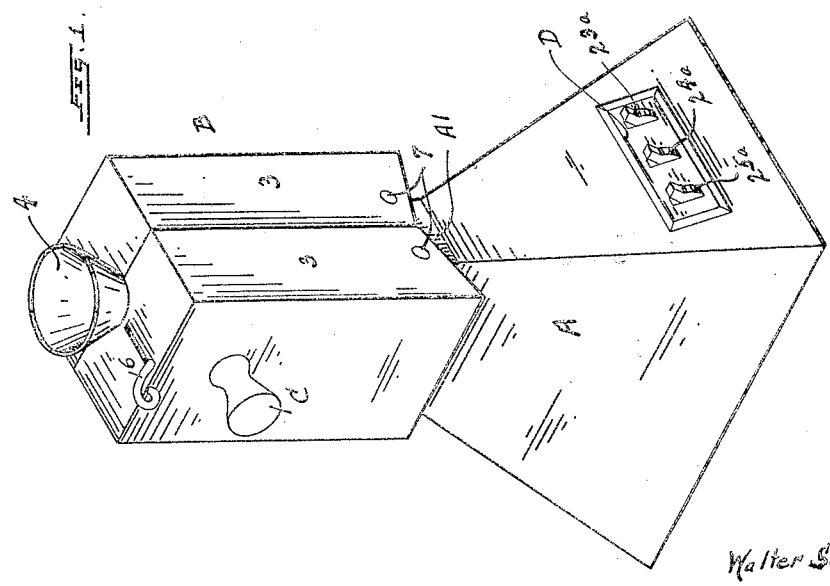

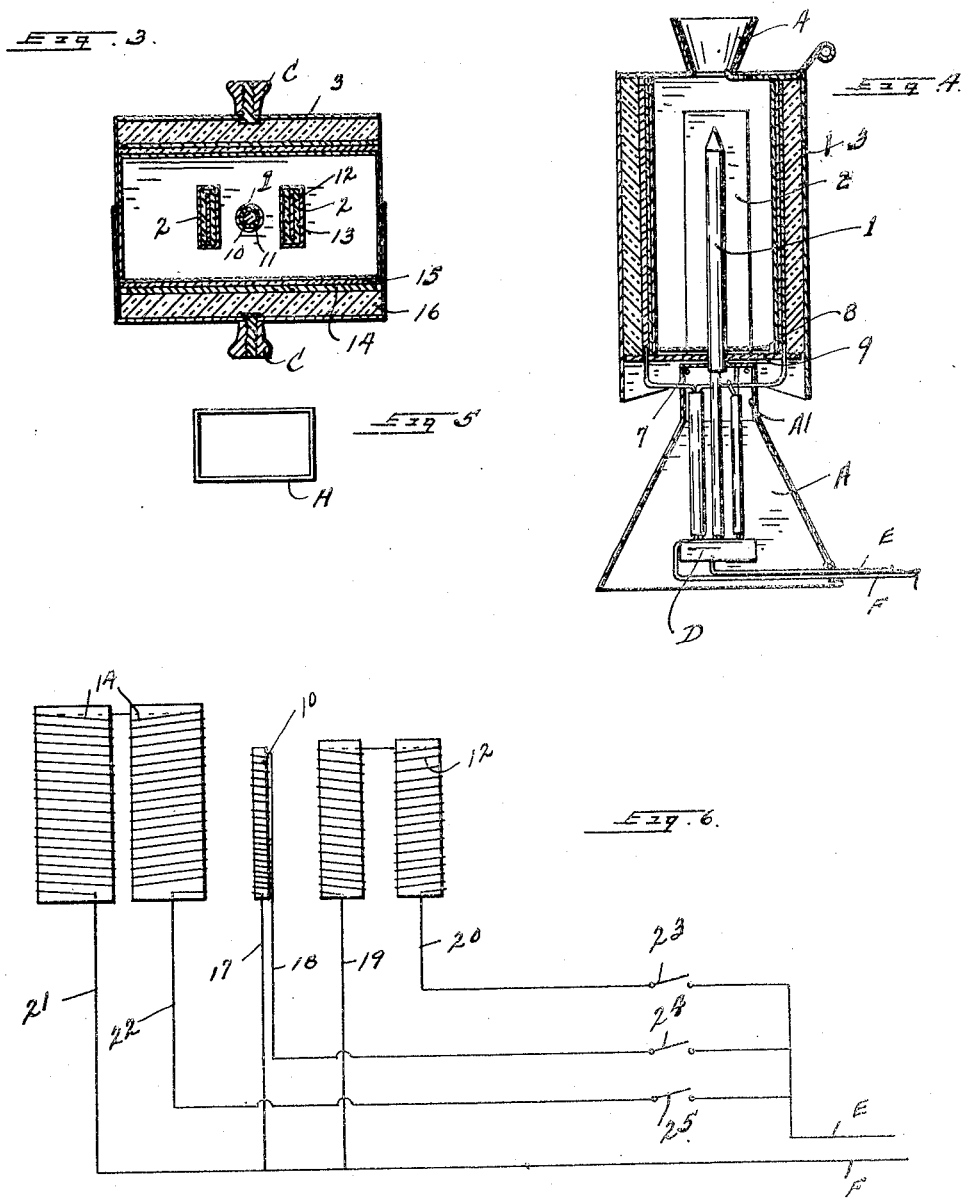

1,882,363

UNITED STATES PATENT OFFICE

WALTER SCOTT KEYTING, OF SALT LAKE CITY, UTAH

CONFECTION BAKING DEVICE

Application filed May 4, 1932. Serial No. 609,208.

My invention relates to baking of confections in which a meat center is cooked and baked into a batter to form a sandwich.

A further object is to provide a machine which may be used to cook weinerwursts into a batter or which may be used with a meat shield for forming a hamburger into a form and then baking a batter therearound; any ground meat may be used as desired and the batter poured therearound and baked into a sandwich.

A still further object is to provide a sandwich baking machine which cooks the meat center into the batter forming a completed sandwich with a central hole thereinto, said hole to be used to pour any type of condiments thereinto which may suit the taste of the person eating the sandwich.

A still further object is to provide a device to electrically cook and produce a sandwich with a center foundation of meat, or meat constituency or of other edible material surrounded by a batter of various palatable doughs leaving a central opening in the center foundation which hole may be filled with any desirable condiment or dressings or flavorings.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the best and most preferred manner of building my invention, Figure 1 is a perspective view of the device shown closed.

Figure 2 is a similar view to Figure 1, with the side heat elements open.

Figure 3 is a transverse section of the baking device closed.

Figure 4 is a vertical section of the device.

Figure 5 is an end view of the meat forming mold used.

Figure 6 is a diagrammatic wiring diagram of the device.

In the drawings I have shown the base A as formed of a frustum of a cone with a top A1 formed thereon with the sidewalls thereof vertical and the top end closed.

Onto the top of the device I then mount my baking device B, which consists of a centrally disposed inner baking element 1, having the top end sharpened to enable the element to be inserted into the end of wienerwurst, Frankfurters etc. Disposed on two sides of the element L, I then provide two baking elements 2, which elements are adapted to bake dough or other material held therearound by the outer casing and baking elements 3. The baking elements 3 are formed semi-box shaped with the sidewalls adapted to overlap and form a tight joint therebetween when the two elements are closed as shown in Figures 1 and 3. Onto the top of one side of one element I provide a pouring funnel 4 which funnel is secured to one side and is adapted to lap over the other element 3 when the elements are together in baking position. The bottom of the funnel is open into the interior of the box form of the elements. A semi-circular portion is omitted from adjacent sides of the closed top end of the elements 3 to allow for pouring of doughs through the funnel into the interior space between the elements 3 and around the elements 2. A closure 5 is provided in the top of one element 3 which closure is adapted to be actuated by the handle 6 protruding through a slot in the top of the element and said closure is to be moved across the openings to close them when the baking is in process.

Each of the elements 3 are pivoted to the top A1 of the base A by pivot pins 7 being passed therethrough. Into the baking portion of the device between the elements 3, I place a removing plate 8 which plate rests on the bottom 9 and which plate may be removed or moved upward when the dough has been baked to the finished sandwich, with the raising of the plate 8 to remove the finished sandwich from the device.

The heat element 1 is hollow and holds a heating element or coil 10 with an insulation 11 there surrounding to provide the heating element for the core of the device. The heat elements 2 are also hollow and contain heat elements or coils 12 surrounded by insulation 13. The elements 3 are each provided with heating elements or coils 14 surrounded by plates of insulation 15 and 16.

The coil 10 is connected with the source of electrical supply from the lead in wire F by the wire 17 and with a control switch 24 by the wire 18. The coils 12 are connected together in series and are connected with the source of electrical energy lead in wire F by the wire 19 and with an electrical switch 23 by the wire 20. The coils 14 of the elements 3 are connected together and with the lead in wire F by the wire 21 and with a control switch 25 by the wire 22. The other lead in wire E provides the electrical energy to the switches in the switch box D. Control knobs 23a, 24a, and 25a, control the switches 23, 24, and 25 and are set in the side of the base A.

The elements 3 are as before stated box-like in structure and are in reality complimentary mold sections which when placed together and held, form the completed mold. The side walls of the elements are constructed so that two edges abut and one edge of one element overlaps the abutting edges to make a tight seal along the vertical sides thereof.

When it is desired to use a ground meat center the mold H is placed over and around the elements 2 and the space therein filled with the ground meats. The mold is then removed before dough is poured into the device.

The operation of the device is as follows: The Frankfurter is placed down on the element 1, then the two elements 3 are placed together and the plate 5 moved back to open the bottom of the funnel 4. The dough is then poured into the interior of the device until it is filled. The plate 5 is then closed and the electric current is turned into the various heat elements 1, 2, and 3, by manual control of the switches 23, 24, and 25. When the dough is baked the elements 3 are separated and the plate 8 raised, freeing the sandwich from the device and it may then be taken therefrom with a fork or other suitable device. The sandwich is then inverted and the holes therein filled with the desired condiments. If desired the Frankfurter or meat may be cooked before pouring the dough therearound in order that it will be well done.

Having thus described my invention I desire to secure by Letters Patent and claim:—

1. In a device of the class described the combination of complementary molds pivotally secured to a common base; heat elements in said molds; a centrally disposed sharpened end heat element within the interior space between said molds; and spaced apart heat elements on each side of said central heat element.

2. In a device of the class described the combination of complementary molds pivotally secured to a common base; means to pour liquid dough into the top of the joined molds; means to heat each mold; a central heat element on which edible materials may be placed; a mold to form said edible material; and spaced apart heat elements to aid in cooking said edible material and said dough, said elements being spaced from the central elements and the sides.

In testimony whereof, I have affixed my signature.

WALTER SCOTT KEYTING.